(12) United States Patent  (10) Patent No.: US 6,704,000 B2
Carpenter  (45) Date of Patent: Mar. 9, 2004

(54) METHOD FOR REMOTE COMPUTER OPERATION VIA A WIRELESS OPTICAL DEVICE

(75) Inventor: Jeffrey Scott Carpenter, Austin, TX (US)

(73) Assignee: Blue Iris Technologies, Austin, TX (US)

(*) Notice: Subject to any disclaimer, the term of this patent is extended or adjusted under 35 U.S.C. 154(b) by 80 days.

(21) Appl. No.: 10/002,052

(22) Filed: Nov. 15, 2001

(65) Prior Publication Data

US 2002/0089489 A1 Jul. 11, 2002

Related U.S. Application Data

(60) Provisional application No. 60/248,896, filed on Nov. 15, 2000.

(51) Int. Cl.[7] .................................................. G09G 5/08
(52) U.S. Cl. ....................................... 345/158; 345/169
(58) Field of Search ................................ 345/156, 157, 345/158, 163, 168, 169; 348/744, 745, 746, 747

(56) References Cited

U.S. PATENT DOCUMENTS

| | | | | |
|---|---|---|---|---|
| 3,885,096 A | * | 5/1975 | Inuiya ............................ 178/15 |
| 4,280,135 A | * | 7/1981 | Schlossberg ................... 348/61 |
| 5,115,230 A | * | 5/1992 | Smoot ............................ 345/9 |
| 5,138,304 A | * | 8/1992 | Bronson ....................... 345/157 |
| 5,181,015 A | * | 1/1993 | Marshall et al. ............. 345/156 |
| 5,489,923 A | * | 2/1996 | Marshall et al. ............. 345/156 |
| 5,502,459 A | * | 3/1996 | Marshall et al. ............. 345/158 |
| 5,504,501 A | * | 4/1996 | Hauck et al. ................. 345/158 |
| 5,515,079 A | * | 5/1996 | Hauck .......................... 345/157 |
| 5,528,263 A | * | 6/1996 | Platzker et al. .............. 345/156 |
| 5,572,251 A | * | 11/1996 | Ogawa ...................... 348/207.99 |
| 5,594,468 A | * | 1/1997 | Marshall et al. ............. 345/158 |
| 5,682,181 A | * | 10/1997 | Nguyen et al. .............. 345/158 |
| 5,914,783 A | * | 6/1999 | Barrus ......................... 356/614 |
| 5,933,132 A | * | 8/1999 | Marshall et al. ............. 345/158 |
| 6,222,593 B1 | * | 4/2001 | Higurashi et al. ........... 348/745 |
| 6,275,214 B1 | * | 8/2001 | Hansen ........................ 345/158 |
| 6,346,933 B1 | * | 2/2002 | Lin ............................... 345/157 |
| 6,512,507 B1 | * | 1/2003 | Furihata et al. ............. 345/157 |

* cited by examiner

*Primary Examiner*—Xiao Wu
(74) *Attorney, Agent, or Firm*—Moster Wynne; Matthew Burb

(57) ABSTRACT

A method for remote operation of a computer having a cursor, via a wireless optical device, comprising projecting a computer output display onto a projection surface via a projecting means, generating an optical point at a desired cursor position on the projected image via the wireless optical device, capturing the image and optical point and transmitting this data to the computer, positioning the cursor on the projected image within a predefined distance of the position of the optical point, measuring a dwell time and executing a computer command when the dwell time exceeds a predefined length of time. The invention may also comprise the step of performing a calibration process to correct imperfections that can occur in the captured or projected image.

26 Claims, 4 Drawing Sheets

METHOD FOR REMOTE COMPUTER OPERATION VIA A WIRELESS OPTICAL DEVICE

REFERENCE TO RELATED APPLICATIONS

This application for patent claims the benefit of U.S. provisional patent application, Serial No. 60/248,896, filed in the United States Patent Office on Nov. 15, 2000.

BACKGROUND OF THE INVENTION

1. Technical Field of the Invention

The invention relates generally to the field of remote operation of computer systems. More specifically, the invention relates to a method for remotely operating a computer system by means of a wireless optical device.

2. Description of Related Art

The use of computer systems greatly enhances and simplifies public presentations of information. Text can be generated and manipulated within computer files to yield an attractive presentation without the potential waste generated by mistakes in slides or overhead transparencies. Conventionally, a desktop or laptop computer is connected with a projector, such as an LCD projector, which projects the output display of the computer onto a larger screen or surface for viewing by an audience. The computer can be instructed to switch among screens of information during the course of the presentation via various devices that instruct the computer to switch among screens.

As the amount of information that a single speaker may present has increased, the need has arisen for devices that can be used to execute a range of commands within the computer that goes beyond switching screens. Prior devices that allowed a user to switch between screens did not allow for more robust operation of a computer system, such as the remote manipulation of the internal cursor or mouse pointer projected from the computer onto the projection surface. Additionally, commands requiring the use of keystrokes or mouse commands, such as clicking combinations used to open files and manipulate command menus, were outside the functions of remote wireless devices. Thus, the speaker was forced either to use wired devices, which limited movement throughout the speaking area; or to return to the computer to execute commands via a keyboard or mouse; or to instruct a second person to operate the computer system. All of these options limited the speaker's ability to deliver an uninterrupted presentation while interacting well with an audience.

Several devices have attempted to overcome these problems, by using conventional remote control technology. Early technologies allowed a user to depress buttons on a remote control device, and commands were issued by the device to a receiver, via RF or IR signal transmission. The receiver processed and relayed the signals to the computer, and corresponding commands were executed. These systems were limited by the speaker's direction and distance relative to the signal receiver, as well as the common interference problems associated with RF and IR technologies. Additionally, the speaker could only direct an audience's attention to a specific point on the screen with great difficulty. A track ball, touch pad, or joystick on the remote control device had to be manipulated by the user in order to reposition a pointer or cursor. This was a slow and cumbersome task that often interrupted the flow of the user's presentation. Though conventional remote technologies were later combined with an optical pointer to designate objects on a projected image, there was no guiding of a cursor about the projected image. Hence, there was no correspondence between the position of the optical point and the commands issued by the remote device.

Recent systems have attempted to address these concerns. U.S. Pat. No. 5,502,459 to Marshall, et al., describes an early system, in which a wand with a light on its tip is used to guide a cursor around a projected image and to issue commands by blinking the light. A computer output display is projected onto a screen by an overhead projector. The image is captured by a charge coupled device (CCD), which feeds the signals it receives from the projected image and wand to a signal processor. The signal processor converts the signals into data that relate to coordinates of the projected image. This data is used to position a cursor about the computer's output display, and hence about the projected image. Blinks in the light source on the wand are used to execute mouse commands, by detecting brief interruptions in the presence of the light source in the signals captured by the CCD. The patented invention is useful, but it still limits the range of movement available to a speaker by the length of the wand. The patent does not teach the additional functionalities necessary for a conventional handheld laser pointer to accomplish the same functions. Additionally, such systems have made a limited market impact, due to the great cost of charge coupled devices, their associated capture cards, and external signal processors. The great cost of this extra hardware is rarely justified for simple remote operation systems, due to the limited utility of the hardware for other purposes that the common speaker is likely to require.

Early efforts at remote operation systems were displaced by the use of less expensive cameras that did not require communication with external signal processors. U.S. Pat. No. 6,275,214 to Hansen describes such a system, using a conventional video camera to capture the output image generated by a computer and projected by an LCD projector. A speaker uses an optical pointer to emit a point onto the projected image. This point is received by the video camera, and its position is translated into a new position for a cursor on the projected image. However, executing commands still requires that the optical point either blink or alter its properties. The patent discloses the alteration of the shape of the optical point, the color of the beam, the number of beams present, or other properties that are used in combination with position to constitute a command at the position of the optical point.

The Hansen system introduces remote operation via an optical pointer that can be used at a significant distance from the projected image. Nonetheless, challenges still exist. One category of challenges addresses the optical pointer itself. First, a conventional optical pointer cannot be used, because properties of the optical point or beam must change to execute mouse commands. This necessitates additional cost for specialized optical pointers. Additionally, users suffer from the same difficulties as systems in which blinking of the optical point is used to generate commands to the computer. Blinking (or changing beam properties) is performed by depressing and releasing a button. This causes the tip of the optical pointer—hence, the point it projects on the projected image—to move from the position at which a command must be executed. Thus, a learning curve is necessary to effectively use the systems, and the curve varies among users. Though some tolerance can be built into a system to account for negligible movements in the optical point, many users find commands difficult to execute.

Additionally, previous systems have been limited by the calibration processes performed before operation. Simple calibration processes have been used in the past, in order to minimize set-up time. They produce simple means for translating between points on a captured image and points on an output display or projected image, minimizing the delay between movement of an optical point and movement of the computer's mouse pointer or cursor on the projected image. However, these processes are limited in the accuracy of their translations. Simple quadratic methods, such as those used by Hansen and Marshall only preserve parallel lines between the projected and captured images. Thus, the use of distracting fiducials on the projected image is required to account for even slight amounts of skew or differences in scale between the projected image and captured image.

There are many other common imperfections that the translation and calibration processes of the prior art do not account for. First, images are often non-rectangular, whether at projection or capturing. Images captured by a digital camera are often quadrilateral, but camera placement relative to a projected image often prevents them from being perfectly rectangular. Thus, there may be few or no parallel lines that can be used to orient the translation processes. This problem becomes more acute, when the projection surface is not perfectly flat, or the camera lens produces an imperfect image, such that the borders of the projected image are bowed or arced known as non-linear pin cushioning). In prior art systems, keystone correction must be used for both the projector and the camera, in conjunction with the calibration and translation processes, to account for imperfect shape. More problematic imperfections have not been accounted for by previous calibration and translation processes, without the use of multiple projectors or projector lenses, as described in U.S. Pat. No. 6,222,593.

Additionally, previous calibration and translation processes limit geometric set-up of system components. For instance, the camera device must sometimes be set up at significant angles relative to the projected image. The camera cannot be aligned at significant angles in previous systems, because the captured image will again be imperfect in shape. Even in a perfectly rectangular image, the nearer side of the projected image can appear longer in the captured image than the far side. Additionally, the top and bottom edges may no longer appear parallel. In other instances, the camera may be disposed on an uneven surface, or the lens of the camera may produce an image, such that the captured is significantly rotated compared with the projected image. Prior art calibration and translation processes do not account for these problems.

Hence, there has been a great need in the art for a method of remotely operating a computer system that overcomes the challenge of cost, by utilizing conventional components; while addressing the challenge of movement in an optical point on the projected image, when executing commands via a wireless optical device; and accounting for the challenge of imperfections in positional accuracy, shape, orientation, rotation, arcing, and angle relative to the projected and captured images, without using multiple iterations of a single system component, without significantly lengthening set-up time or run time operation, and without requiring keystone or alternative correction means in individual system components.

SUMMARY OF THE INVENTION

The current invention provides a novel method of remotely operating a computer system via a wireless optical device. The current invention addresses the foregoing challenges and provides further advantages, by providing a method that may be implemented in a low-cost system, consisting of conventional components. The method also executes computer commands via the wireless optical device, without the complications involved with blinking or otherwise altering the properties of the point of the optical device. The method also provides increased accuracy in translating between points on the projected and captured images, while accounting for positional accuracy, angular differences, skew, elongation, rotation, arcing and other imperfect shaping, and differences between projected and captured images, without significantly lengthening set-up or run time, without using multiple iterations of a single system component, and without requiring keystone correction in individual system components.

The current invention relates to a method for remote operation of a computer having a cursor, via a wireless optical device. The method comprises projecting an image onto a projection surface via a projecting means. The projected image is a projection of the output display of the computer and shows the cursor as part of the projected image. The cursor may be a mouse pointer, typically represented on a computer display as a hand or arrow, or any other suitable cursor representation. The method also comprises generating an optical point at a desired cursor position on the projected image via the wireless optical device. The projected image and the optical point collectively form an image that is captured by an image sensing device and transmitted to the computer. The position of the cursor on the output display of the computer—hence, on the projected image—is then moved to within a predefined distance of the position of the optical point. The method also comprises calculating a dwell time, which is a time period during which the optical point is positioned within a predefined distance of any single point on the projected image. When the dwell time exceeds a predefined length of time, at least one computer command is executed by the computer. The predefined length of time may be selected by a user.

The computer commands that may be executed using the invented method may comprise any of a single left-mouse-click, double left-mouse-click, right-mouse-click, a mouse command, or a keyboard command.

The invented method may also comprise performing a calibration process after the step of projecting an image and before generating the optical point at a desired cursor position on the projected image. The calibration process comprises generating the optical point via the wireless optical device, within a predefined distance about each of at least four single points on the projected image. The optical point is maintained about each point for a predefined calibration time. The calibration process also comprises capturing a captured image via the image sensing device during each calibration period. The captured image comprises the projected image and optical point. During each calibration period, the optical point is detected at a calibration position. Each calibration position comprises a coordinate of the captured image.

The calibration process also comprises calculating a plurality of control positions equal in number to the plurality of calibration positions. Each control position comprises a coordinate of the output display of the computer, and hence the projected image. Each control position and each calibration position are submitted to a matrix creation means. The step of calculating control positions may be performed before, after, or simultaneously with the steps preceding their submission to the matrix creation means. At least one matrix is calculated via the matrix creation means, each matrix being capable of solving for at least eight degrees of freedom.

The matrices are used throughout the operation of the system to translate between points on the captured image and the output display or projected image, such that precise cursor manipulation about the projected image may take place by moving the optical point that is generated by the wireless optical device.

This calibration process is more robust than those used in the prior art and is thus able to account for many more imperfections in the projected or captured images than the prior art, without the need for keystone correction or multiple projectors or lenses. Moreover, once the initial matrices are calculated, the additional time needed to apply them during run time operation of the overall system is negligible, compared with the simpler processes used in the prior art. The calibration process also allows the image sensing device to be positioned at significant angles relative to the projected image, whether in the horizontal or vertical planes, or a combination of both, while still correcting the captured image. The optical points in the captured image are translated by the matrix or matrices formed by the calibration process, to accurately portray a cursor's position in the projected image.

Aspects of the invented method may be embodied in computer software programs, or functions thereof. Hence the current invention is also directed to computer readable storage media having stored data representing functions executable by a computer to execute commands and position a cursor of the computer, based on a dwell time of an optical point generated onto a projected image by a wireless optical device. The various functions may include performing a calibration process comprising calculating at least four control positions and detecting an optical point at a calibration position during each of at least four calibration periods; submitting each control position and each calibration position to a matrix creation means; and generating via the matrix creation means at least one matrix, each matrix able to solve for at least eight degrees of freedom. The functions also include measuring a dwell time and executing a computer command when the dwell time exceeds a predefined length of time.

DETAILED DESCRIPTION OF THE INVENTION

Figure 1:
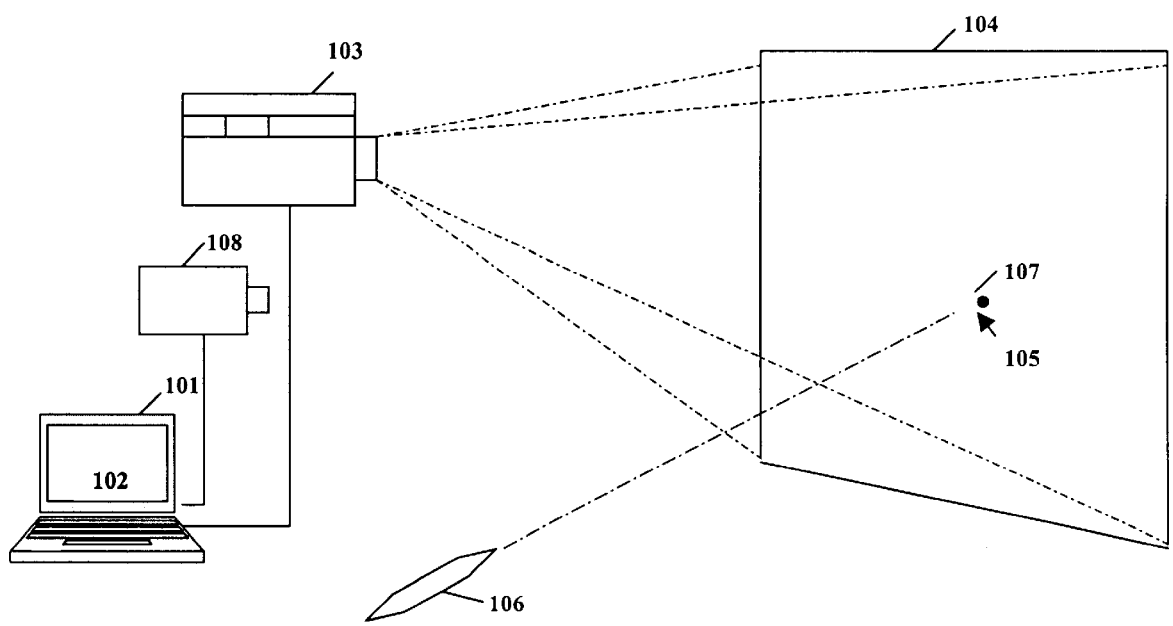
FIG. 1 is a block diagram illustrating components of a system in which the current invention may be implemented.

Referring now to FIG. 1, there is illustrated a system for implementing a method for remotely operating a computer via a wireless optical device. A computer 101 produces an output display 102. The computer may comprise a laptop computer, desktop computer, palmtop computer, or other suitable computing device for generating an output display and receiving commands. The output display 102 may be viewed initially on an active screen, such as a television, plasma television, or a monitor connected to or integrated with the computer 101. The computer output display 102 is transmitted to a projection device 103, which projects the contents of the output display 102 onto a projection surface 104. The projection device 103 may comprise an LCD projector or other device suitable for projecting the contents of a computer output display onto a projection surface, such that the projected image is readable by an audience. The projection surface may comprise a projection screen, a wall, a curtain, a markerboard, or other suitable passive surface for reflecting the contents of a projected image. The output display 102 of the computer 101 includes a movable cursor 105, which is in turn displayed on the projected image. The cursor 105 may comprise a mouse pointer, such as the arrow shown in the figure. A user operates a wireless optical device 106 to generate an optical point 107 at a desired cursor position on the image projected onto the projection surface 104. The wireless optical device may comprise a laser pointer, or another suitable pointing device capable of emitting visible light at a point on the projected image.

An image sensing device 108 captures the optical point 107 and at least a substantial portion of the projected image. The image sensing device 108 is connected with computer 101 and may comprise an analog video camera, a digital camera, a PC camera, or other suitable device for capturing an image and communicating directly with a computer. The image sensing device 108 transmits data corresponding to the captured image to the computer 101. The cursor 105 is guided about the projected image and commands are executed by the computer 101 at the position of the optical point 107, via the method of the current invention, which is described in further detail below. Examples of such commands may comprise any of a single left-mouse-click, double left-mouse-click, right-mouse-click, a mouse command, or a keyboard command.

In the system shown in FIG. 1, the positions of the projector 103 and image sensing device 108 are preferably fixed. The positioning of the image sensing device 108 may cause it to be placed at an angle between zero and sixty degrees, horizontally, vertically, or both, relative to the projected image. The image sensing device 108 may be adapted to filter wavelengths or intensities of light outside a desired range, such that interference is minimized from ambient light sources, other wireless optical devices, and the like.

Figure 2:
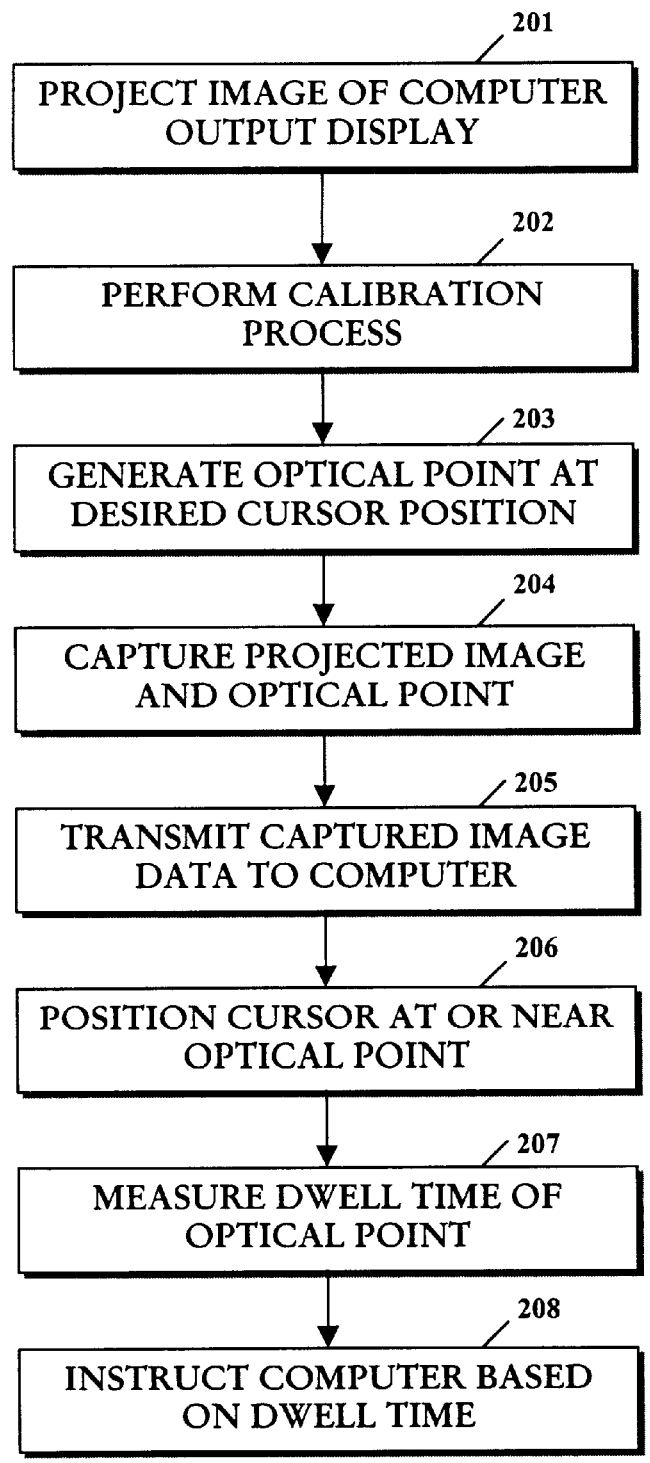
FIG. 2 is a flow diagram illustrating steps of the invented method.

Referring now to FIG. 2, there is illustrated a flow diagram comprising various steps of a method for remote computer operation via a wireless optical device, in accordance with the current invention. The control logic of the method is preferably implemented by at least one computer software program embodied on a computer-readable medium and executed by the computer that is being controlled via the method, without regard to the operating system of the computer or the language of the software programs. It will be appreciated by those skilled in the art that some steps of the method may performed in series, and some in parallel or in series. For instance, the measurement of dwell time may occur simultaneously with the positioning of the displayed cursor. Additionally, the order of the steps may in some instances be changed, without departing from the scope of or the advantages achieved by the current invention. The order in the illustration is given for ease of explanation.

In accordance with step 201, a computer communicates its output display content, including a cursor, to a projection device and an image of the output display is projected onto a projection surface. The computer may comprise a laptop computer, desktop computer, palmtop computer, or other suitable computing device for generating an output display and receiving commands. The output display may be viewed initially on an active screen, such as a television, plasma television, or a monitor connected to or integrated with the computer. The projection device may comprise an LCD projector or other device suitable for projecting the contents of a computer output display onto a projection surface, such that the projected image is readable by an audience. The projection surface may comprise a projection screen, a wall, a curtain, a markerboard, or other suitable passive surface for reflecting the contents of a projected image. The output display of the computer includes a movable cursor, which is in turn displayed on the projected image. The cursor may comprise a mouse pointer, such as an arrow, a hand, or other shape.

In accordance with step 202, a calibration process is performed. The calibration process may comprise any suitable process for creating a means or function, according to which points on an image captured by an image sensing device may be translated into points on the projected image. In one embodiment, the means comprises a transformation matrix.

In accordance with the calibration process used in the current invention, a user uses a wireless optical device to generate an optical point about a single point on the projected image. The user maintains the optical point within a predefined distance about the single point for a predefined period of time. The projected image with the optical point shone about the single point is captured by an image sensing device. The optical point is detected at a calibration position, which is a coordinate of the captured image, the coordinate having at least two dimensions. The detection may occur by averaging the position of the optical point during the predetermined calibration period, by detecting the position of the optical point at the end of the calibration period, or by other suitable means for generating a calibration position. The calibration position is submitted to a matrix creation means. This procedure is performed until at least four total calibration positions are submitted to the matrix creation means. The number of the calibration positions may be selected by the user. The user may also select the general location of each calibration position as it relates to the projected image. Preferably, the control positions are spaced as far apart as possible. These options may be presented separately or conjointly by a computer software program that implements a portion of the invention. For instance, a user may select the four corners of the projected image as the points about which he or she will generate an optical point. Alternatively, the points may be at control positions selected by the user that are co-linear, randomly spaced or positioned, which separate the projected image or captured image into quadrants, or which are automatically selected by the computer implementing the calibration process.

The computer calculates a number of control positions, equal in number to the calibration positions. The control positions may be calculated from the size of the captured image as acquired from a capture driver, the current screen size, as obtained from Windows® API, or a similar implement, or other suitable property of the captured image, projected image, or output display. The control positions preferably correspond to the locations of the calibration positions. Each control position is submitted to the matrix creation means in the form of a coordinate of the output display, each coordinate having at least two dimensions.

From the calibration positions and control positions, the matrix creation means calculates a matrix suitable for translating between points in the image captured by the image sensing device and points in the projected image. Preferably, the matrix that is generated is capable of solving for at least eight degrees of freedom. This matrix is then used to translate between points in the captured image and points in the output display of the computer, and hence the projected image. Example embodiments of the calibration process are discussed with reference to FIGS. 3 and 4.

Once the calibration process has been performed, a user operates a wireless optical device to generate an optical point at a desired cursor position on the image projected onto the projection surface, in accordance with step 203. The wireless optical device may comprise a laser pointer, or another suitable pointing device capable of emitting visible light at a point on the projected image. In accordance with step 204, the image sensing device captures the optical point and at least a substantial portion of the projected image. The image sensing device is connected with the computer and may comprise an analog video camera, a digital camera, a PC camera, or other suitable device for capturing an image and communicating directly with a computer.

In accordance with step 205, the image sensing device transmits data corresponding to the captured image to the computer. In accordance with step 206, a software program or device driver translates the position of the optical point in the captured image to a point in the output display of the computer, via the matrix formed during the calibration process of step 202, and then directs the computer to position its cursor at or near the position of the optical point that has been captured by the image sensing device.

In accordance with step 207, the device driver or software program calculates the time during which the optical point or cursor is continuously illuminated and positioned within a predetermined distance of a point in the projected image. This time may be called a "dwell time." In accordance with step 208, the software program or device driver instructs the computer to execute commands when the dwell time exceeds a predefined time length. Those skilled in the art will appreciate the various means of performing, repeating, and resetting such a calculation. In one embodiment, the predefined time length comprises two seconds, such that when the optical point is continuously illuminated within a predefined distance of a point in the projected image, for at least two seconds, a command is executed by the computer. Examples of commands that may be executed upon dwell times of differing lengths may include a single left-mouse-click, a double left-mouse-click, a right-mouse-click, a mouse command, or a keyboard command.

In a system implementing the method shown in FIG. 2, the positions of the projector and image sensing device are preferably fixed. The positioning of the image sensing device may cause it to be placed at an angle between zero and sixty degrees, horizontally, vertically, or both, relative to the projected image. The image sensing device may be adapted to filter wavelengths or intensities of light outside a desired range, such that interference is minimized from ambient light sources, other wireless optical devices, and the like.

Figure 3:
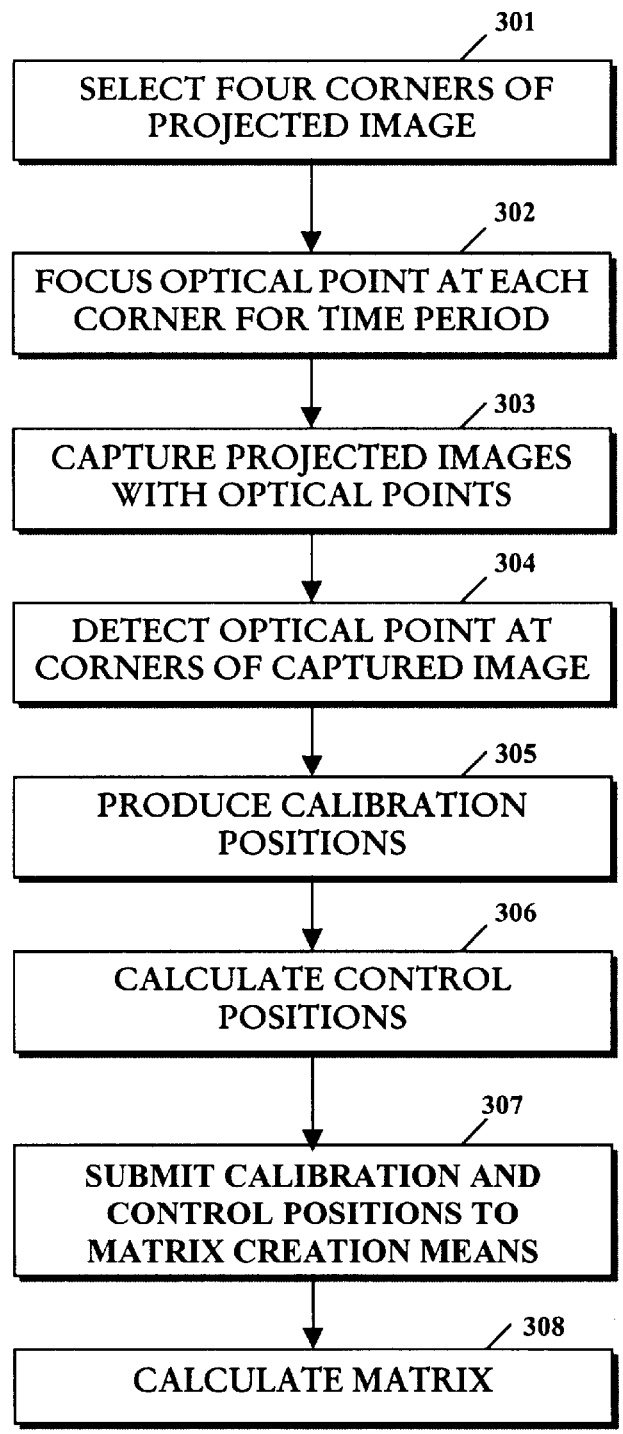
FIG. 3 is a flow diagram illustrating steps for a first embodiment of a calibration process in accordance with the current invention.

Referring now to FIG. 3, an example embodiment for a calibration method is illustrated. This embodiment is only offered as an example, for purposes of further explaining the calibration process referenced in FIG. 2, and is not intended to limit the scope of the calibration process or the current invention to the particular figures or specifications included in the example.

The calibration process may comprise any suitable process for creating a means or function, according to which points on an image captured by the image sensing device may be translated into points on the projected image. In one embodiment, the means is a matrix.

In accordance with the calibration process used in the current invention, a user selects a number of calibration positions to be used. The computer being controlled via the current method may prompt the user for a number of calibration positions. The user may also select the general location of each calibration position. These options may be presented separately or conjointly by prompts issued by a computer software program that implements a portion of the invention. In this example, the user selects the four corners of the projected image to be used for the calibration process, in accordance with step 301.

In accordance with step 302, the user focuses the optical point of the wireless optical device within a predefined distance of each corner. The user maintains the optical point within a predefined distance of each corner for a predefined period of time. In accordance with step 303, the projected image with the optical point shone about each corner is captured by an image sensing device. In accordance with step 304, the optical point is detected in each captured image. In accordance with step 305, the position of the optical point in each captured image is detected at a coordinate of the captured image. In this embodiment, the coordinates comprise the four corners of the captured image. These coordinates comprise four calibration positions, each represented by a coordinate having at least two dimensions. In accordance with step 306, four control positions are created, corresponding to the coordinates of the corners of the computer output display and hence the projected image. The control positions may be calculated from the size of the captured image as obtained from a capture driver, or from the current output display screen size, as obtained from Windows® API, or a similar implement, or from other suitable information.

In accordance with step 307, each calibration position and each control position is fed into a matrix creation means, such as a transformation algorithm. In accordance with step 308, the matrix creation means then generates a three-by-three matrix that is used to translate between points in the image captured by the image sensing device and points in the projected image, until a new calibration process is performed.

Those skilled in the art will appreciate that the steps of this calibration process need not be performed in the order they are shown in the figure. The steps may be performed in series, in rapid sequence, or in parallel, where applicable. For instance, the calibration positions and the coordinate for each may be determined individually, or simultaneously once all captured image data has been transmitted to the computer. Likewise, the coordinate for each calibration position may be fed into the matrix creation means individually, or after all have been determined. The control positions may be calculated before, after, or during any of the steps preceding submission to the matrix generation means and after the user selects the number of points to be used for the calibration process.

The advantages of the calibration process described with reference to FIG. 3 are that it can account for many imperfections in the projected or captured image, translating between points in the captured image and points in the output display of the computer with great precision. This advantage generally cannot be accounted for by translation matrices having fewer than eight degrees of freedom. For instance, the image sensing device must sometimes be operated at a significant angle relative to the projected image. In such instances, the captured image will be skewed to account for the view of the device. That is, the side of the projected image nearest to the device can appear longer than the far side, and the top and bottom edges may not appear parallel. Depending whether the camera is placed at a horizontal or vertical angle, this effect can take the form of skew and/or elongation/compression of the captured image relative to the projected image. In other instances, the image sensing device may be positioned on an uneven surface, or its lens captures the projected image, such that the captured image will appear rotated. A matrix that occupies eight degrees of freedom can account for any of these effects with great precision, even where the amount of skew or elongation is great, or the rotation of the captured image causes it to appear nearly like a diamond shape.

Figure 4:
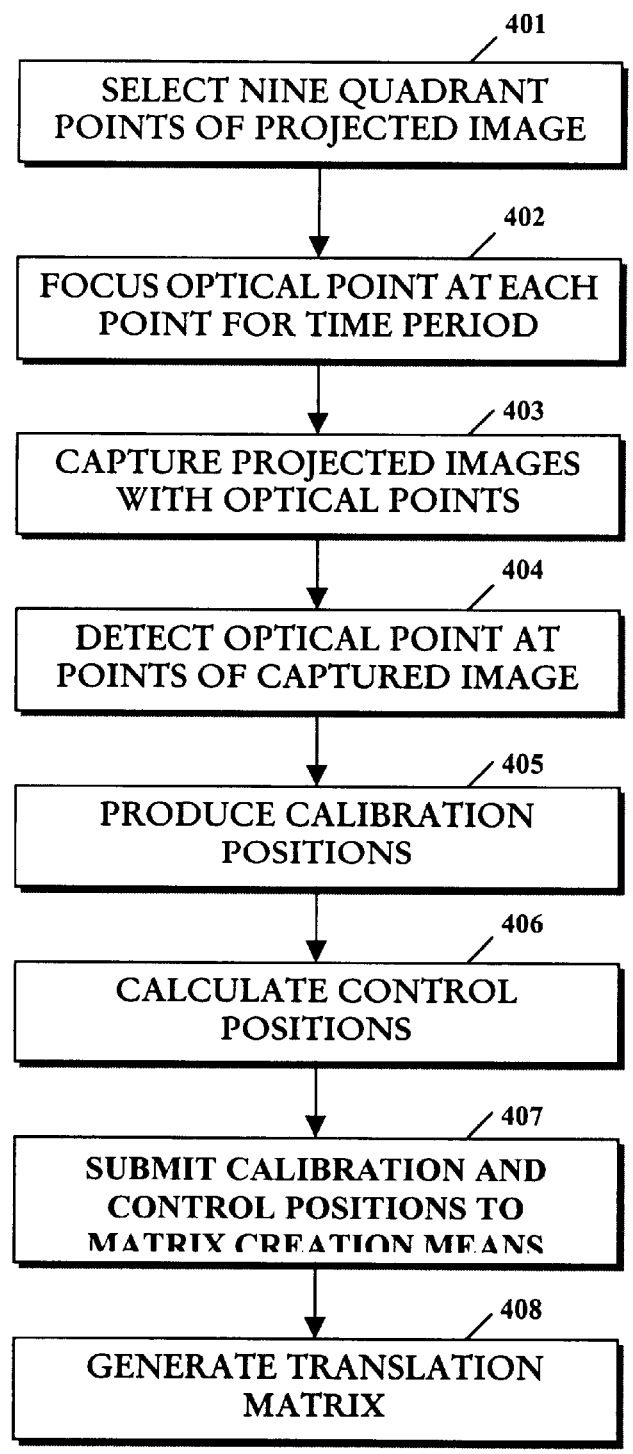
FIG. 4 is a flow diagram illustrating steps for a second embodiment of a calibration process in accordance with the current invention.

Referring now to FIG. 4, there is illustrated a flow diagram for a second example embodiment of the calibration process described with reference to FIG. 2. This embodiment is only offered as an example, for purposes of further explaining the calibration process referenced in FIG. 2, and is not intended to limit the scope of the calibration process or the current invention to the particular figures or specifications included in the example.

The calibration process may comprise any suitable process for creating a means or function, according to which points on an image captured by the image sensing device may be translated into points on the projected image. In one embodiment, the means is a matrix.

In accordance with the calibration process used in the current invention, a user selects a number of calibration positions to be used. The computer being controlled via the current method may prompt the user for a number of calibration positions. The user may also select the general location of each calibration position. These options may be presented separately or conjointly by prompts issued by a computer software program that implements a portion of the invention. In this example, the user selects nine points separating the projected image into quadrants, to be used for the calibration process, in accordance with step 401. Namely, these points comprise the four corner points of the image, the midpoint between each pair of corners (four total midpoints), and the center point of the projected image.

In accordance with step 402, the user focuses the optical point of the wireless optical device within a predefined distance of each of the nine points. The user maintains the optical point within a predefined distance of each point for a predefined period of time. In accordance with step 403, the projected image with the optical point shone about each point is captured by an image sensing device. In accordance with step 404, the optical point is detected in each captured image. In accordance with step 405, the position of the optical point in each captured image is detected at a coordinate of the captured image. In this embodiment, the coordinates comprise the nine points separating the captured image into quadrants. These coordinates comprise nine calibration positions, each represented by a coordinate having at least two dimensions. In accordance with step 406, nine control positions are created, corresponding to the coordinates of the nine points separating the computer output display and hence the projected image into quadrants. The control positions may be calculated from the size of the captured image as obtained from a capture driver, or from the current output display screen size, as obtained from Windows® API, or a similar implement, or from other suitable information.

In accordance with step 407, each calibration position and each control position is fed into a matrix creation means, such as a transformation algorithm. In accordance with step 408, the matrix creation means then generates a three-by-three matrix that is used to translate between points in the image captured by the image sensing device and points in the projected image, until a new calibration process is performed.

Those skilled in the art will appreciate that the steps of this calibration process need not be performed in the order they are shown in the figure. The steps may be performed in series, in rapid sequence, or in parallel, where applicable. For instance, the calibration positions and the coordinate for each may be determined individually, or simultaneously once all captured image data has been transmitted to the computer. Likewise, the coordinate for each calibration position may be fed into the matrix creation means individually, or after all have been determined. The control positions may be calculated before, after, or during any of the steps preceding submission to the matrix generation means and after the user selects the number of points to be used for the calibration process.

In addition to providing great precision during translation of points, this calibration embodiment provides the advantage of correcting a common problem known as non-linear pin cushioning. The effect of non-linear pin cushioning occurs where the projected image is disposed on a non-flat surface, or as a result of the lens of the image sensing device, such that the edges of the image are bowed or arced. The calibration process described with reference to FIG. 4 allows for translation with greater accuracy than less computationally intensive means, by estimating the line between each corner and the next midpoint, rather than estimating the line between each pair of corners. Yet, the method of calibration requires only one additional calculation during run time operation, unlike more computationally intensive means. The calibration process described with reference to FIG. 4 is that it can account for this effect, while still translating accurately between points in the captured image and points on the output display of the computer.

While the foregoing material describes and illustrates the current invention with reference to particular embodiments, these embodiments are intended as examples and not to define the entire scope of the current invention. Those skilled in the art will appreciate that many aspects of these embodiments may be changed without departing from the spirit or scope of the invention.

What is claimed is:

1. A method for remote operation of a computer having a cursor, via a wireless optical device, comprising:
   a. projecting an image onto a projection surface via a projecting means, the projected image comprising an output display of the computer and the output display showing the cursor;
   b. generating an optical point at a desired cursor position on the projected image via the wireless optical device;
   c. capturing a captured image via an image sensing device, the captured image comprising the projected image and the optical point;
   d. transmitting the captured image to the computer;
   positioning the cursor on the projected image within a predefined distance of the desired cursor position;
   f. measuring a dwell time, the dwell time comprising a time period during which the optical point is positioned within a predefined distance of the desired cursor position; and
   g. automatically executing at least one computer command when the dwell time exceeds a predefined time length, the at least one computer command comprising a command selected from the group consisting of a single left-mouse-click a double left-mouse-click, a right-mouse-click, a mouse command or a keyboard command.

2. The method of claim 1, wherein the predefined time length is selectable by a user.

3. The method of claim 1, further comprising, after the step of projecting an image and before the step of generating an optical point at a desired cursor position, performing a calibration process.

4. The method of claim 3, wherein performing the calibration process comprises the steps:
   i) generating the optical point via the wireless optical device, within a predefined distance about each of at least four single points on the projected image, during a calibration period, each calibration period comprising a predefined calibration time;
   ii) capturing a captured image via the image sensing device during each calibration period, the captured image comprising the projected image and optical point;
   iii) detecting the optical point at a calibration position, during each calibration period, each calibration position comprising a coordinate of the captured image;
   iv) calculating a plurality of control positions equal in number to the plurality of calibration positions, each control position comprising a coordinate of the output display;
   v) submitting each control position and each calibration position to a matrix creation means; and
   vi) calculating via the matrix creation means at least one matrix, each matrix capable of solving for at least eight degrees of freedom.

5. The method of claim 4, further comprising, after the step of transmitting the captured image to the computer and before the step of positioning the cursor, the step of translating each point in the captured image to a point in the projected image, via the at least one matrix.

6. The method of claim 5, wherein the plurality of control positions comprises four corners of the projected image.

7. The method of claim 5, wherein the plurality of control positions comprises four corners of the projected image, four points midway between each pair of corners of the projected image, and a center point of the projected image.

8. The method of claim 5, wherein a number of control positions and the position of each control position are selectable by a user.

9. The method of claim 1, wherein a center point of the projection surface occupies a plane; and
   the image sensing device is positioned to face the plane from an angle between thirty and ninety degrees, the angle measured in at least one direction relative to the plane.

10. The method of claim 9, further comprising, after the step of projecting an image and before the step of generating an optical point: at a desired cursor position, performing a calibration process.

11. The method of claim 10, wherein performing the calibration process comprises the steps:
   i) generating the optical point via the wireless optical device, within a predefined distance about each of at least four single points on the projected image, during a calibration period, each calibration period comprising a predefined calibration tune;
   ii) capturing a captured image via the image sensing device during each calibration period, the captured image comprising the projected image and optical point;

iii) detecting the optical point at a calibration position, during each calibration period, each calibration position comprising a coordinate of the captured image;

iv) calculating a plurality of control positions equal in number to the plurality of calibration positions, each control position comprising a coordinate of the output display;

v) submitting each control position and each calibration position to a matrix creation means; and vi) calculating via the matrix creation means at least one matrix, each matrix capable of solving for at least eight degrees of freedom.

12. The method of claim 11, further comprising, after the step of transmitting the captured image to the computer and before the step of positioning the cursor, the step of translating each point in the captured image to a point in the projected image, via the at least one matrix.

13. The method of claim 12, wherein the plurality of control positions comprises four corners of the projected image.

14. The method of claim 12, wherein the plurality of control positions comprises four corners of the projected image, four points midway between each pair of corners of the projected image, and a center point of the projected image.

15. The method of claim 12, wherein a number of control positions and the position of each control position are selectable by a user.

16. The method of claim 1, wherein the cursor comprises a mouse pointer.

17. A method for remote operation of a computer having a cursor, via a wireless optical device, comprising:

a. projecting an image onto a projection surface via a projecting means, the projected image comprising an output display of the computer and the output display showing the cursor;

b. performing a calibration process, comprising i) generating the optical point via the wireless optical device, within a predefined distance about each of at least four single points on the projected image, during a calibration period, each calibration period comprising a predefined calibration time;

ii) capturing a set-up captured image via an image sensing device during each calibration period, the set-up captured image comprising the projected image and the optical point;

iii) detecting the optical point at a calibration position, during each calibration period, each calibration position comprising a coordinate of the captured image;

iv) calculating a plurality of control positions equal in number to the plurality of calibration positions, each control position comprising a coordinate of the output display;

v) submitting each control position and each calibration position to a matrix creation means; and vi) calculating via the matrix creation means at least one matrix, each matrix capable of solving for at least eight degrees of freedom;

c. generating an optical point at a desired cursor position on the projected image via the wireless optical device;

d. capturing a run-time captured image via the image sensing device, the captured image comprising the projected image and the optical point;

e. transmitting the nm-time captured image to the computer;

f. translating each point in the run-time captured image to a point in the projected image, via the at least one matrix;

g. positioning the cursor on the projected image within a predefined distance of the position of the optical point;

h. measuring a dwell time, the dwell time comprising a time period during which the optical point is positioned within a predefined distance of the desired cursor position; and i. executing a computer command when the dwell time exceeds a predefined time length.

18. The method of claim 17, wherein the predefined time length is selectable by a user.

19. The method of claim 17, wherein the plurality of control positions comprises four corners of the projected image.

20. The method of claim 17, wherein the plurality of control positions comprises four corners of the projected image, four points midway between each pair of corners of the projected image, and a center point of the projected image.

21. The method of claim 17, wherein a number of control positions and the position of each control position are selectable by a user.

22. The method of claim 21, wherein a center point of the projection surface occupies a plane; and the image sensing device is positioned to face the plane from an angle between thirty and ninety degrees, the angle measured in at least one direction relative to the plane.

23. The method of claim 17, wherein the cursor comprises a mouse pointer.

24. The method of claim 17, wherein the at least one computer command comprises a command selected from the group consisting of a single left-mouse-click, a double left-mouse-click, a right-mouse-click, a mouse command, or a keyboard command.

25. A computer readable storage medium having stored data representing functions executable by a computer to execute commands and position a cursor of the computer, based on an optical point generated onto a projected image by a wireless optical device, the functions comprising:

measuring a dwell time, the dwell time comprising a rime period during which the optical point is positioned within a predefined distance of a single point on the projected image; and automatically executing a computer command when the dwell time exceeds a predefined time length, the at least one computer command comprising a command selected from the group consisting of a single left-mouse-click, a double left-mouse-click, a right-mouse-dick, a mouse command, or a keyboard command.

26. A computer readable storage medium having stored data representing functions executable by a computer to execute commands and position a cursor of the computer, based on an optical point generated onto a projected image by a wireless optical device, the functions comprising:

performing a calibration process comprising i) a user selecting a number of control positions, and a position for each control position;

ii) the user generating the optical point via the wireless optical device, within a predefined distance about each of at least four single points on the projected image, during a calibration period, each calibration period comprising a predefined calibration time;

iii) capturing a captured image via an image sensing device during each calibration period, the captured image comprising the projected image and optical point;

iv) detecting the optical point at a calibration position, during each calibration period, each calibration position comprising a coordinate of the captured image;
v) calculating a plurality of control positions equal in number to the plurality of calibration positions, each control position comprising a coordinate of the output display;
vi) submitting each control position and each calibration position to a matrix creation means; and
vii) calculating via the matrix creation means at least one matrix, each matrix capable of solving for at least eight degrees of freedom;

measuring a dwell time, the dwell time comprising a time period during which the optical point is positioned within a predefined distance of a single point on the projected image; and executing a computer command when the dwell time exceeds a predefined time length, the time length selectable by a user.

* * * * *